US012538949B2

(12) United States Patent
Herring

(10) Patent No.: US 12,538,949 B2
(45) Date of Patent: Feb. 3, 2026

(54) PERSONAL PROTECTION EQUIPMENT FOR PROTECTING A USER FROM AIRBORNE PATHOGENS

(71) Applicant: Rodney Herring, Victoria (CA)

(72) Inventor: Rodney Herring, Victoria (CA)

( * ) Notice: Subject to any disclaimer, the term of this patent is extended or adjusted under 35 U.S.C. 154(b) by 674 days.

(21) Appl. No.: 17/912,474

(22) PCT Filed: Mar. 15, 2021

(86) PCT No.: PCT/CA2021/050344
§ 371 (c)(1),
(2) Date: Sep. 16, 2022

(87) PCT Pub. No.: WO2021/184111
PCT Pub. Date: Sep. 23, 2021

(65) Prior Publication Data
US 2023/0165322 A1 Jun. 1, 2023

(30) Foreign Application Priority Data
Mar. 16, 2020 (CA) ................................ CA 3076157
May 5, 2020 (CA) ................................ CA 3080340
Dec. 7, 2020 (CA) ................................ CA 3101797

(51) Int. Cl.
*A41D 13/11* (2006.01)
*A62B 23/02* (2006.01)

(52) U.S. Cl.
CPC ............ *A41D 13/11* (2013.01); *A62B 23/025* (2013.01)

(58) Field of Classification Search
CPC .... A41D 13/11; A41D 13/00; A41D 13/1192; A62B 23/025; A62B 18/02; A62B 18/025; A62B 23/02; Y02A 50/30
See application file for complete search history.

(56) References Cited

U.S. PATENT DOCUMENTS 3,603,315 A * 9/1971 Becker, III ......... A41D 13/1115 128/206.19
3,688,768 A * 9/1972 Reimschussel .... A41D 13/1146 128/206.12

(Continued)

FOREIGN PATENT DOCUMENTS

CA 3100189 12/2018
CN 101532229 A 9/2009

(Continued)

OTHER PUBLICATIONS

Translation of DE-102017002544-A1 (Year: 2018).*

(Continued)

*Primary Examiner* — Victoria Murphy
(74) *Attorney, Agent, or Firm* — Baumgartner Patent Law, LLC; Marc Baumgartner

(57) ABSTRACT

A disposable mask or optically transparent mask comprising a mask body is provided. The disposable mask includes a periphery, and straps attached to the mask body proximate the periphery for releasably retaining the mask on a user's face, the mask body including: an inner layer, which is a polymeric plastic material with a plurality of passageways therethrough, and which has an inner surface and an outer surface; and a porous glass filter which is functionalized with a visible light photocatalyst and abuts the outer surface of the inner layer. Apparel comprising fiberglass which is functionalized with a visible light photocatalyst is also provided.

6 Claims, 9 Drawing Sheets

(56) References Cited

U.S. PATENT DOCUMENTS

| | | | | |
|---|---|---|---|---|
| 4,467,799 | A * | 8/1984 | Steinberg | A41D 13/1176 128/206.25 |
| 5,665,450 | A | 9/1997 | Day | |
| 7,320,713 | B2 | 1/2008 | Hirata | |
| 2008/0092909 | A1 | 4/2008 | Hahne | |
| 2010/0190401 | A1 | 7/2010 | Mangold | |
| 2015/0177423 | A1 | 6/2015 | Scipioni | |
| 2017/0013894 | A1 | 1/2017 | Lee | |
| 2018/0028431 | A1 | 2/2018 | Chiattello | |
| 2018/0228227 | A1 | 8/2018 | Dieu | |
| 2019/0125011 | A1 | 5/2019 | Eisenbrey | |
| 2019/0282460 | A1 | 9/2019 | Amari | |
| 2019/0297967 | A1 | 10/2019 | Buffalini | |
| 2020/0132899 | A1 | 4/2020 | Aghanouri | |
| 2020/0164616 | A1 | 5/2020 | Carlyle | |

FOREIGN PATENT DOCUMENTS

| | | | | |
|---|---|---|---|---|
| CN | 206006037 | | 3/2017 | |
| CN | 110536746 | A | 12/2019 | |
| DE | 102017002544 | A1 * | 9/2018 | A61M 16/0672 |
| EP | 1008565 | A1 | 6/2000 | |
| WO | WO-2010120730 | A1 * | 10/2010 | A62B 23/02 |
| WO | 2013/149400 | A1 | 10/2013 | |
| WO | WO-2018064747 | A1 * | 4/2018 | B01J 37/06 |

OTHER PUBLICATIONS

WIPO, Canadian International Searching Authority, International Search Report mailed Jun. 17, 2021, International Patent Application No. PCT/CA2021050344, 5 Pages.

WIPO, Canadian International Searching Authority, Written Opinion of the International Searching Authority mailed Jun. 17, 2021, International Patent Application No. PCT/CA2021050344, 6 Pages.

WIPO, Canadian International Searching Authority, International Preliminary Report on Patentability completed Jun. 20, 2022, International Patent Application No. PCT/CA2021050344, 5 Pages.

https://www.thedentalmarket.ca/infection/face-shield-protective-cover-transparent-1-pk/?gclid=EAlalQobChMltomGptL27AIViR-tBh29-AeYEAQYASABEgK8kPD_BwE.

* cited by examiner

PERSONAL PROTECTION EQUIPMENT FOR PROTECTING A USER FROM AIRBORNE PATHOGENS

CROSS REFERENCE TO RELATED APPLICATIONS

The present invention is filed under 35 U.S.C. § 371 as the U.S. national phase of International Application No. PCT/CA2021/050344, filed 15 Mar. 2021, which designated the U.S. and claims the benefit of Canadian Patent Application Serial No. 3076157, filed on Mar. 16, 2020 and entitled MASK FOR PROTECTING A USER FROM AIRBORNE PATHOGENS, Canadian Patent Application Serial No. 3080340, filed on May 5, 2020 and entitled PERSONAL PROTECTION EQUIPMENT FOR PROTECTING A USER FROM AIRBORNE PATHOGENS and Canadian Patent Application Serial No. 3101797, filed on Dec. 7, 2020 and entitled OPTICALLY TRANSPARENT FACE MASK FOR PROTECTING A USER FROM AIRBORNE PATHOGENS each of which are hereby incorporated in their entirety including all tables, figures, and claims.

FIELD

The present technology is directed to a disposable or optically transparent mask and other apparel that can be worn by a user to protect them from airborne microbes, including bacteria, fungus and viruses. More specifically, it is a mask that kills a substantial percentage of airborne microbes on contact and additionally traps the microbes, while minimally restricting air flow to the user.

BACKGROUND

It is well known that filters need to have a 0.2 micrometer (micron) pore size or smaller to sterilize liquids and gases. Despite this, disposable masks for protecting against disease have much larger pore sizes. For example, the N95 mask, which is promoted as the mask of choice for the general public to wear, has a pore diameter of 0.3 microns. As the name suggests, the mask is supposed to remove 95% of particulate matter that is 0.3 microns or larger in diameter. Unfortunately, many bacteria are smaller than 0.3 microns. For example, *Haemophilus influenzae* ranges in diameter from about 0.2 microns to about 0.3 microns. Viruses are generally smaller than bacteria and may range is diameter from 30 nanometers (0.03 microns) for the polio virus to 120-150 nanometers (0.120-0.150 microns) for the HIV-1 virus. The COVID-19 virus is reported to range in diameter between about 0.06 microns to about 0.14 microns. Based on the foregoing, it is apparent that the N95 mask is insufficient to protect a user from some bacteria and most viruses, both of which are the most common pathogens.

Another problem with the disposable masks is contamination. Even if the mask can reduce the passage of pathogens from the ambient to the user, the mask is then contaminated. If the mask is not properly disposed of or is reused, it then becomes a source of infection.

Yet another problem with disposable masks is air flow. As the pore size restricts air flow, these masks are not suitable for users with breathing issues, such as decreased lung capacity and shortness of breath. In one study, breathing through N95 mask materials have been shown to impede gaseous exchange and impose an additional workload on the metabolic system. Specifically, N95-mask materials reduced mean tidal volume by 23.0% (95% CI −33.5% to −10.5%, $p<0.001$) and lowered minute ventilation by 25.8% (95% CI −34.2% to −15.8%, $p<0.001$), with no significant change in breathing frequency compared to breathing ambient air. Volumes of oxygen consumption ($VO_2$) and carbon dioxide expired ($VCO_2$) were also significantly reduced; $VO_2$ by 13.8% (95% CI −24.2% to −3%, p=0.013) and $VCO_2$ by 17.7%, (95% CI −28.1% to −8.6%, p=0.001).

Yet another problem with the prior art disposable face masks is that a user's facial expression and facial movement cannot be seen. This is especially difficult for those who are deaf or hard of hearing and rely on lip reading to follow a conversation.

In a related technology, United States Patent Application 20190125011 discloses a disposable face mask that changes color as an indicator of fever to provide hospitals with a quick and inexpensive method for triaging infected patients while limiting exposure to others. While this may assist in the rapid identification of an infected patient it does not address the concerns relating to the use of disposable masks. Specifically, it does not address contamination of the mask, poor gas exchange and incomplete capture of pathogens.

United States Patent Application 20170013894 discloses a disposable mask equipped with a plastic bag, which is easily disposed of by sealing a mask body with the plastic bag after use of the mask body. The disposable mask includes an outshell and a lining which are integrally formed into one body by thermal bonding. The disposable mask includes a mask body having an oblong shape and including a wire disposed at the upper side thereof and adhering the mask body closely to the face of a user in accordance with the facial contour and ear bands disposed at both sides of the mask body, and a plastic bag disposed between the outshell and the lining at the upper side of the mask body and allowing the mask body to be hygienically disposed of after use. While this addresses the contamination issue, by providing a bag to store the contaminated mask in, it does not provide a means for killing the pathogen, nor does it address poor gas exchange and incomplete capture of the pathogen.

The use of iron-doped titanium dioxide in wastewater remediation is disclosed in WO2018064747, which is directed to a method of making a visible light photo-catalyst, the method comprising doping a titanium dioxide nanocrystal with iron to provide an iron-doped nanocrystal, washing the iron-doped nanocrystal with an acid to produce an acid-washed iron-doped titanium dioxide nanocrystal and rinsing the acid-washed iron-doped titanium dioxide nanocrystal to remove a residual of the acid, thereby providing a visible light photo-catalyst. The visible light photo-catalyst is low iron oxide, iron-doped titanium dioxide.

United States Patent Application Publication No. 20200164616 discloses a nonwoven cellulose fiber fabric, in particular directly manufactured from lyocell spinning solution, wherein the fabric comprises a network of substantially endless fibers, wherein different ones of the fibers are located at least partially in different distinguishable interconnected layers, and wherein the fabric is optically transparent when wet.

United States Patent Application Publication No. 20200132899 discloses substrates with transparency to infrared body radiation and opacity in the visible light spectrum and systems and methods for creation thereof. The IR radiation transparent substrate is IR radiation transparent and visible light opaque with enough breathability and softness to make it suitable for use in garments for body thermal regulation. Further, the IR radiation transparent substrate is created utilizing nanofiber technology to form specific sized micro pores between the nanofibers.

United States Patent Application Publication No. 20190282460 discloses that nanofibers are applied, for example, in fields that require optical characteristics, such as high transparency, employing nanosize effects. For example, a transparent fabric can be achieved by setting the diameter of the nanofibers to a dimension less than or equal to visible wavelengths.

United States Patent Application Publication No. 20150177423 discloses opto textiles that utilize and exploit the light interaction characteristics of the fiber or yarn itself, and the light interaction characteristics of the fabric as a whole, such that the fabric presents a given appearance or provides a given visual effect, adequately cools a wearer/user, adequately heats a wearer/user, and/or fulfills a life-style or therapeutic function, for example. In various exemplary embodiments, the present invention provides fibers, yarns, and fabrics that manage and manipulate the properties of light, such as wavelength, propagation direction, degree of coherence, and intensity, utilizing, for example, the light-matter interaction, fluorescence, phosphorescence, photochromism, thermochromism, and heat-activated light generation, such that application-specific needs may be met.

A textile, either woven or nonwoven, that can become highly transparent and render the object behind it visible to an observer when illuminated with light of specific spectral content is possible using the present invention. The same textiles become colored and no more transparent when illuminated with light having a different spectral content.

The ability to be transparent or not transparent depends on the type of illuminating light and on the type of fluorescent nanoparticles used in the textile. The absorption and emission properties of the fluorescent nanoparticles are such that light with certain wavelengths is selectively absorbed and converted to light of a different wavelength as long as the incident light wavelength is shorter than the wavelengths comprising the emission spectrum of the fluorescent particles. For example, consider a shirt made of a material containing fluorescent nanoparticles emitting green light. The green fluorescent light has a specific wavelength. The nanoparticles can absorb any light having wavelength that is shorter than the wavelength of green fluorescent light. Light with wavelengths longer than the wavelength of green is not absorbed and the material becomes effectively transparent at light at those wavelengths. This would not be suitable for masks or other articles of clothing as one would not be able to select the wavelength of light needed to provide transparency—the wavelengths would be dictated by the source of light, which is normally sunlight or artificial lighting used in houses and the like.

United States Patent Application Publication No. 20100190401 discloses transparent planar material for architectural purposes, having several coatings. Said coating system is selective on wavelength having a high transmission in the visible spectral range and high reflection in the infrared spectral range. The mentioned coatings are metal coatings and metal-oxide coatings.

U.S. Pat. No. 5,665,450 discloses glass ribbon-reinforced transparent polymer composites which provide excellent optical transparency and a low distortion level over a wide temperature range while exhibiting superior mechanical properties as compared to non-reinforced polymer counterparts, and equivalent properties as compared to glass fiber-reinforced counterparts. These products are solid and are used for windshields and the like.

U.S. Pat. No. 7,320,713 discloses a method of burning noble metals in high-pressure water using hydrogen and oxygen to produce noble metal micro-dispersion water in which super-fine noble metal particles are dispersed, and use the obtained noble metal micro-dispersion water to treat fiber products in order to provide high-function fiber products, typically clothes, which offer excellent health-promoting function and cleanliness-improving function.

Face shields such as those found at https://www.thedentalmarket.ca/infection/face-shield-protective-cover-transparent-1-pk/?qclid=EAlalQobChMltomGptL27AIViR-tBh29-AeYEAQYASABEqK8kPD_BwE have been found to be less effective in stopping disease transmission than disposable or reusable face masks. In fact, when used in the medical and dental profession, they are used in conjunction with a disposable mask.

CN 101532229 discloses a process for flattening post treatment of electronic grade glass fiber cloth, and aims to provide a process for flattening post treatment of the electronic grade glass fiber cloth which has good resin impregnation property, good water resistance, good surface slickness and low air permeability. The process comprises the following steps: obtaining an un-desized glass fibercloth after being woven by a jet loom, washing and soaking the cloth by a water washing device of which the water temperature is between 50 and 90 DEG C., performing flattening processing and shaping on the cloth by a cooling impression roller of which the pressure is between 10 and 70 kg/cm<2> and the cooling water temperature is between 5 and 25 DEG C., coiling the un-desized glass fiber cloth after the flattening processing and shaping by an iron core and performing heat desizing treatment by a heat desizing furnace directly to obtain flattened glass fiber cloth of which the organic residue quantity is less than 0.04 percent, and performing coupling agent dipping treatment by a vertical surface processing machine set to obtain the flattened electronic grade glass fiber cloth. The process can be widely applied in the field of the electronic grade glass fiber cloth. The product has low air permeability and hence is not suitable for use in a face mask.

WO2013149400 discloses a treatment process for flattening electronic-grade glass fiber cloth and the electronic-grade glass fiber cloth produced by using same. First, the yarns are wound on the warp beam while sizing the yarn monofilament to take the sizing finishing process, and then the obtained warps are combined and woven to get fatty glass fiber cloth. Subsequently, the obtained fatty glass fiber cloth is set in a steaming oven for fumigating and swelling. With the effect of the ejection and fumigation of the saturated steam under the high temperature and high humidity environment, the highly expansive starch among the yarns swells rapidly under the heat and humidity, and the spaces among yarn bundles increase when the yarn bundles are kept under the high temperature and high humidity environment for some time to form secondary structural reorganization. And subsequently, the obtained swollen glass fiber cloth is heated continuously and stewed to degrease under the high temperature. Finally, the obtained degreased glass fiber cloth is opened by high-pressure injection, extruded to eliminate excess water, and impregnated with a silane coupling agent through a surface processing machine.

Other Personal Protection Equipment:

A major concern over personal protection apparel used in the health care industry is the spread of disease while doffing the apparel. At present, the apparel must be carefully removed such that a user's body does not come in contact with a surface that could be contaminated with a pathogen. The apparel must be turned inside out as it is being removed, then rolled up and disposed of. The user must then thoroughly sanitize their hands. If not done correctly, the user could unwittingly transmit the pathogen to themselves or others.

Personal protective apparel includes gloves, caps, gowns, booties and pants, with gloves and gowns being the most commonly used. Face shields are also used to protect health care workers.

United States Patent Application Publication Number 20190297967 discloses a disposable contact isolation gown for protection from hospital-acquired infections. The contact isolation gown includes a front panel including a front collar edge, a pair of front shoulder edges, a pair of front side edges, and a front bottom edge. The gown also includes a back panel coupled to the front panel at a pair of side seams. The back panel includes a back collar edge, a back line of weakness extending from the back collar edge to the back bottom edge, and a pair of back panel portions coupled together at the back line of weakness. The gown also includes a pair of arm panels coupled between the front panel and the back panel. Each arm panel includes an arm panel back edge, an arm panel front edge, and an arm panel collar edge. This does not address contamination of the gown.

United States Patent Application Publication Number 20180228227 discloses a disposable hospital gown for the purpose of quick wear and quick removal without sacrificing the protection of harmful substances and contaminates for the provider/user. This does not address contamination of the gown.

What is needed is a face mask that kills a substantial percentage of airborne microbes on contact and additionally traps the microbes, while minimally restricting air flow to the user. It would be preferable if it was disposable. It would be preferable if it was inexpensive to manufacture. It would be further preferable if it was form-fitting to a user's face, covering the chin, mouth and nostrils. It would be further preferable if it was an optically transparent face mask that allows the facial expressions and facial movements of a user to be seen. It would be preferable if it allowed for lip reading. Additionally, it would be preferable to also provide respirators that kill a substantial percentage of airborne pathogens on contact and additionally traps the pathogens. Further it would be preferable to also provide apparel and face shields that kill a substantial percentage of airborne pathogens on contact.

SUMMARY

The present technology is a face mask that kills a substantial percentage of airborne microbes on contact and additionally traps the microbes, while minimally restricting air flow to the user. It is disposable and inexpensive to manufacture. It is form-fitting to a user's face, covering the chin, mouth and nostrils. In one embodiment it is optically transparent and allows for lip reading.

In one embodiment, a disposable mask is provided which comprising a mask body, which includes a periphery, and straps attached to the mask body proximate the periphery for releasably retaining the mask on a user's face, the mask body including: an inner layer, which is a polymeric plastic material with a plurality of passageways therethrough, and which has an inner surface and an outer surface; and a porous glass filter which is functionalized with a visible light photocatalyst and abuts the outer surface of the inner layer.

In the disposable mask, the visible light photocatalyst may be a low iron oxide, iron-doped titanium dioxide nanoparticle.

In the disposable mask, the porous glass filter may be in a filter zone bounded by a boundary zone, the boundary zone comprising the inner layer and extending from the filter zone to the periphery.

In the disposable mask, the porous glass filter may be a fiberglass fabric.

In the disposable mask, the low iron oxide, iron-doped titanium dioxide nanoparticles may have substantially iron oxide free surfaces.

In the disposable mask, the mask body may further comprise a formable border proximate the periphery of the inner surface of the inner layer.

In the disposable mask, the mask body may further comprise a transparent outer cover which is a polymeric plastic material with a plurality of passageways therethrough and abuts the fiberglass filter.

In the disposable mask, the mask body may further comprise a filter layer, the filter layer abutting the outer surface of the inner layer.

In the disposable mask, the filter layer may consist of unbonded plastic polymer fibers.

In one embodiment face mask comprising an optically transparent or optically semi-transparent mask body is provided. The face mask includes a periphery about an edge of the optically transparent or optically semi-transparent mask body and straps attached to the mask body proximate to the periphery or attached to the periphery for releasably retaining the mask on a user's face, the mask body including: an inner layer, which is an optically transparent or optically semi-transparent material with a plurality of passageways therethrough, and which has an inner surface and an outer surface; and a fiberglass fabric layer which abuts the outer surface of the inner layer and which comprises fiberglass ribbons.

In the face mask, the fiberglass fabric may be functionalized with a visible light photocatalyst.

In the face mask, a refractive index of the optically transparent or optically semi-transparent material of the inner layer and a refractive index of the fiberglass ribbons of the fiberglass fabric layer may be within about 0.06 of one another.

In the face mask, the visible light photocatalyst may be low iron oxide, iron-doped titanium dioxide.

In the face mask, the low iron oxide, iron-doped titanium dioxide may be nanoparticles.

In the face mask, the low iron oxide, iron-doped titanium dioxide nanoparticles may have substantially iron oxide free surfaces.

In the face mask, the mask body may further comprise a formable border proximate to the periphery.

In the face mask, the mask body may further comprise an outer cover which is an optically transparent or optically semi-transparent material with a plurality of passageways therethrough and which abuts the fiberglass fabric layer.

In the face mask, a refractive index of the optically transparent or optically semi-transparent material of the outer cover, the refractive index of the optically transparent or optically semi-transparent material of the inner layer and the refractive index of the fiberglass ribbons of the fiberglass fabric layer may be within about 0.060.

In the face mask, the mask body may further comprise an optically transparent or optically semi-transparent filter layer, the filter layer between the outer surface of the inner layer and the fiberglass fabric layer.

In the face mask, the optically transparent or optically semi-transparent filter layer may consist of unbonded plastic polymer fibers.

In the face mask, a refractive index of the unbonded plastic polymer fibers, the refractive index of the optically transparent or optically semi-transparent material of the outer cover, the refractive index of the optically transparent or optically semi-transparent material of the inner layer and the refractive index of the fiberglass ribbons of the fiberglass fabric layer may be within about 0.060.

In the face mask, the inner layer may comprise a silk fibroin or a rayon material.

In the face mask, the inner layer may be a silk fibroin material.

In the face mask, the outer layer may comprise a silk fibroin or rayon material.

In the face mask, the outer layer may be a silk fibroin material.

In the face mask, the mask body may be optically transparent.

In the face mask, the fiberglass fabric layer may consist of fiberglass ribbons functionalized with low iron oxide, iron-doped titanium dioxide nanoparticles that have substantially iron oxide free surfaces.

In another embodiment, a method of manufacturing an optically semi-transparent or optically transparent mask body for a face mask is provided, the method comprising: selecting a fiberglass material consisting of fiberglass ribbons functionalized with low iron oxide, iron-doped titanium dioxide nanoparticles; shaping the fiberglass material into a mask body shape; selecting an inner layer consisting of an optically transparent or optically semi-transparent material with a refractive index within 0.06 of a refractive index of the fiberglass material; shaping the optically transparent of optically semi-transparent material into the mask body shape; and attaching the inner layer to the fiberglass material, thereby manufacturing an optically semi-transparent or transparent mask body.

The method may further comprise selecting an outer layer consisting of an optically transparent or optically semi-transparent material with a refractive index within 0.06 of the refractive index of the fiberglass material and the inner layer; and attaching the outer layer to the fiberglass material, thereby manufacturing an optically semi-transparent or transparent mask body.

In the method, the mask body may reduce mean tidal volume by no more than about 16.2%.

In another embodiment, an article of personal protection apparel is provided, the article comprising a fiberglass fabric functionalized with a visible light photocatalyst.

In the article, the visible light photocatalyst may be a low iron oxide, iron-doped titanium dioxide nanoparticle.

In the article, the low iron oxide, iron-doped titanium dioxide nanoparticles may have substantially iron oxide free surfaces.

The article may be selected from the group consisting of a cap, a gown, a hooded gown, a pair of booties and a pair of pants.

In another embodiment, a face shield is provided, the face shield comprising a band and a transparent visor which is attached to the band, the transparent visor functionalized with a visible light photocatalyst.

In the face shield, the visible light photocatalyst may be a low iron oxide, iron-doped titanium dioxide nanoparticle.

In the face shield, the low iron oxide, iron-doped titanium dioxide nanoparticles may have substantially iron oxide free surfaces.

FIGURES

DESCRIPTION

Figure 1:
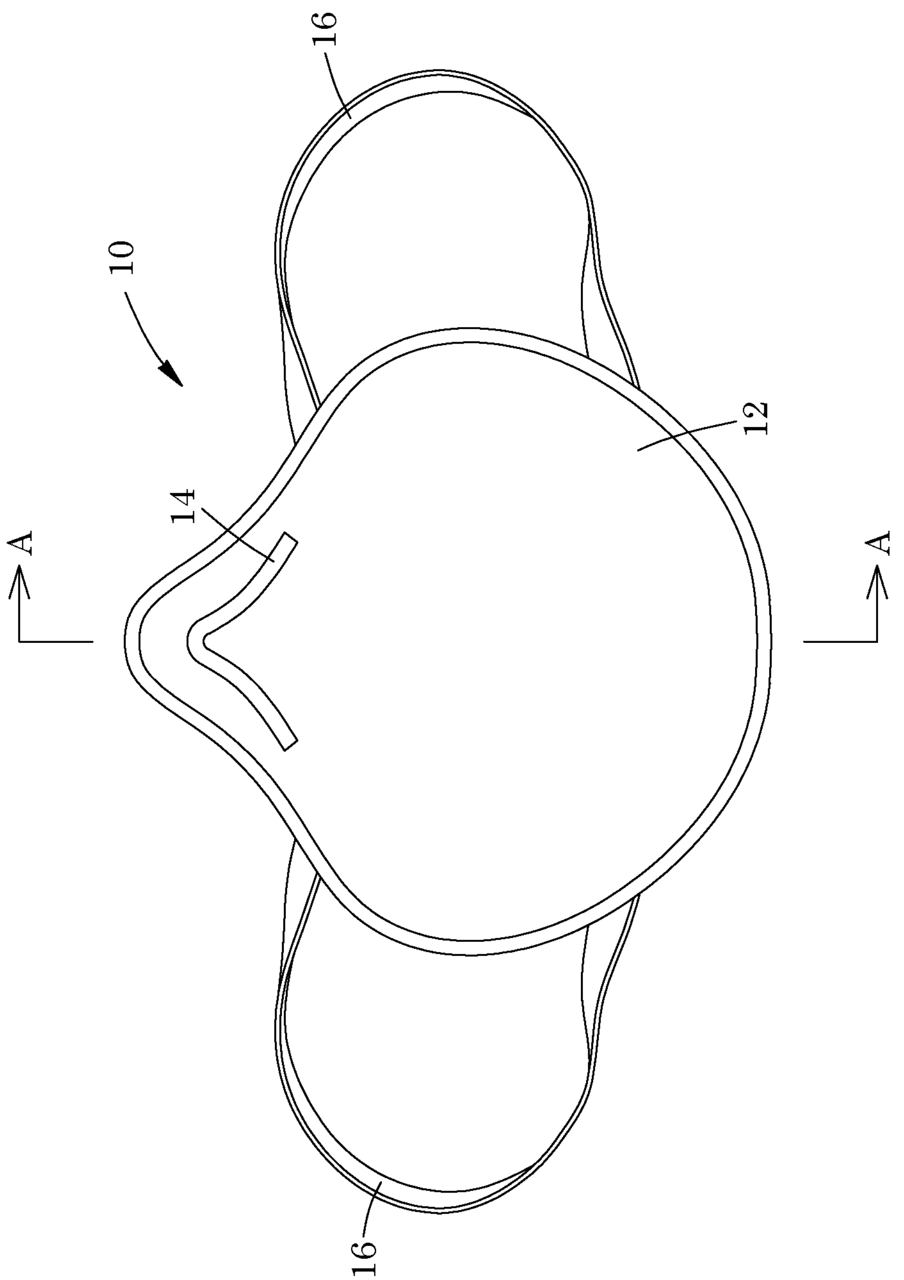
FIG. 1 is a perspective view of the disposable mask of the present technology.

Except as otherwise expressly provided, the following rules of interpretation apply to this specification (written description and claims): (a) all words used herein shall be construed to be of such gender or number (singular or plural) as the circumstances require; (b) the singular terms "a", "an", and "the", as used in the specification and the appended claims include plural references unless the context clearly dictates otherwise; (c) the antecedent term "about" applied to a recited range or value denotes an approximation within the deviation in the range or value known or expected in the art from the measurements method; (d) the words "herein", "hereby", "hereof", "hereto", "hereinbefore", and "hereinafter", and words of similar import, refer to this specification in its entirety and not to any particular paragraph, claim or other subdivision, unless otherwise specified; (e) descriptive headings are for convenience only and shall not control or affect the meaning or construction of any part of the specification; and (f) "or" and "any" are not exclusive and "include" and "including" are not limiting. Further, the terms "comprising," "having," "including," and "containing" are to be construed as open-ended terms (i.e., meaning "including, but not limited to,") unless otherwise noted.

Recitation of ranges of values herein are merely intended to serve as a shorthand method of referring individually to each separate value falling within the range, unless otherwise indicated herein, and each separate value is incorporated into the specification as if it were individually recited herein. Where a specific range of values is provided, it is understood that each intervening value, to the tenth of the unit of the lower limit unless the context clearly dictates otherwise, between the upper and lower limit of that range and any other stated or intervening value in that stated range, is included therein. All smaller sub ranges are also included. The upper and lower limits of these smaller ranges are also included therein, subject to any specifically excluded limit in the stated range.

Unless defined otherwise, all technical and scientific terms used herein have the same meaning as commonly understood by one of ordinary skill in the relevant art. Although any methods and materials similar or equivalent to those described herein can also be used, the acceptable methods and materials are now described.

Definitions

Pathogen—in the context of the present technology, a pathogen is a living microbe that causes disease. Pathogens include but are not limited to a bacterium, a fungus or a virus.

Aerosol—in the context of the present technology an aerosol is a suspension of solid and/liquid particles in a gas.

Fiberglass fabric—in the context of the present technology, fiberglass fabric is comprised of glass threads in a plain weave. It may have any thread count, for example, but not limited to 20×14 to 60×52, to 70×70 and may have a thickness, of, for example, but not limited to 2.5 microns to 250 microns. The thread count and the thickness of the threads determines the porosity of the end product.

Iron-doped titanium dioxide with a low iron oxide surface—in the context of the present technology, iron-doped titanium dioxide with a low iron oxide surface has about 0.1 atomic % iron to about 2.0 atomic % iron, preferably 0.25 atomic % iron to about 0.75 atomic % iron, and more preferably 0.5 atomic % iron and very small amounts of iron oxide on its surface (less than 5% of the surface being iron oxide) when viewed with X-ray photoelectron spectroscopy.

Fiberglass ribbons—in the context of the present technology, a fiberglass ribbon is a length of fiber that has been flattened.

Flattened fiber, fiberglass fabric—in the context of the present technology, fiberglass fabric is comprised of glass threads in a plain weave. It may have any thread count, for example, but not limited to 20×14 to 60×52, to 70×70 and may have a thickness, of, for example, but not limited to 2.5 microns to 250 microns. The thread count and the thickness of the threads determines the porosity of the end product. The glass threads, also known as fibers, are all flattened into ribbons on the same plane and that plane is parallel to the upper and the lower surface of the face mask.

Optically transparent—in the context of the present technology, optically transparent means that images can be seen through the material.

Substantially iron oxide free surface—in the context of the present technology, a substantially iron oxide free surface has an iron oxide content corresponding to less than about 0.001% atomic iron (less than 0.5% of the surface being iron oxide) when viewed with X-ray photoelectron spectroscopy.

Fluid—in the context of the present technology, a fluid is a gas, a liquid or both.

Airborne—in the context of the present technology, airborne includes aerosols and particles in the air.

Porous glass filter layer—in the context of the present technology, a porous glass filter layer is a layer of fiberglass fabric or a layer of sintered glass.

DETAILED DESCRIPTION

A disposable mask, generally referred to as 10 is shown in FIG. 1. The mask has a mask body 12, a nose piece 14 and two straps 16. The nose piece 14 is formable and is preferably aluminum or a pliable plastic, which when molded on a user's nose retains its shape. The straps 16 are preferably elastomeric and are retained on the mask body 12. The mask body 12 is sufficiently resilient to maintain its shape when in use. It may be, as shown, cup-shaped.

Figure 2:
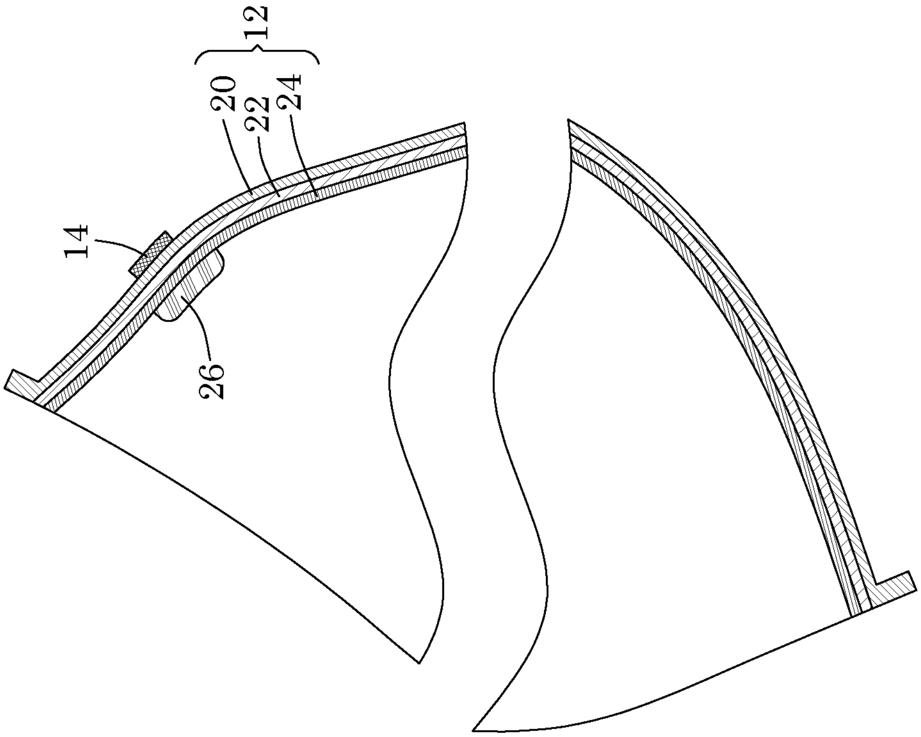
FIG. 2 is a sectional view through lines A-A of FIG. 1.

As shown in FIG. 2, the mask body 12 is lamellar with an outer cover 20, a fiberglass filter layer 22 and an inner layer 24. The outer cover 20 is preferably a polyester or other plastic polymer and is transparent to visible light. The polyester or other plastic polymer is made of fibers which are either bonded to one another or are woven, in order to provide passageways. The fiberglass filter layer 22 is woven. It is functionalized with low iron oxide, iron-doped titanium dioxide nanoparticles. The inner layer 24 is a polyester or other woven plastic polymer. The polyester or other plastic polymer is made of fibers which are either bonded to one another or are woven, in order to provide passageways. Nose foam 26 is attached to the inner layer 24 under the nose piece 14.

In an alternative embodiment, the outer cover 12 is a silk fibroin material. It may be woven or printed, such as three dimensionally printed or lithographically printed to provide a suitable pore size.

Figure 3:
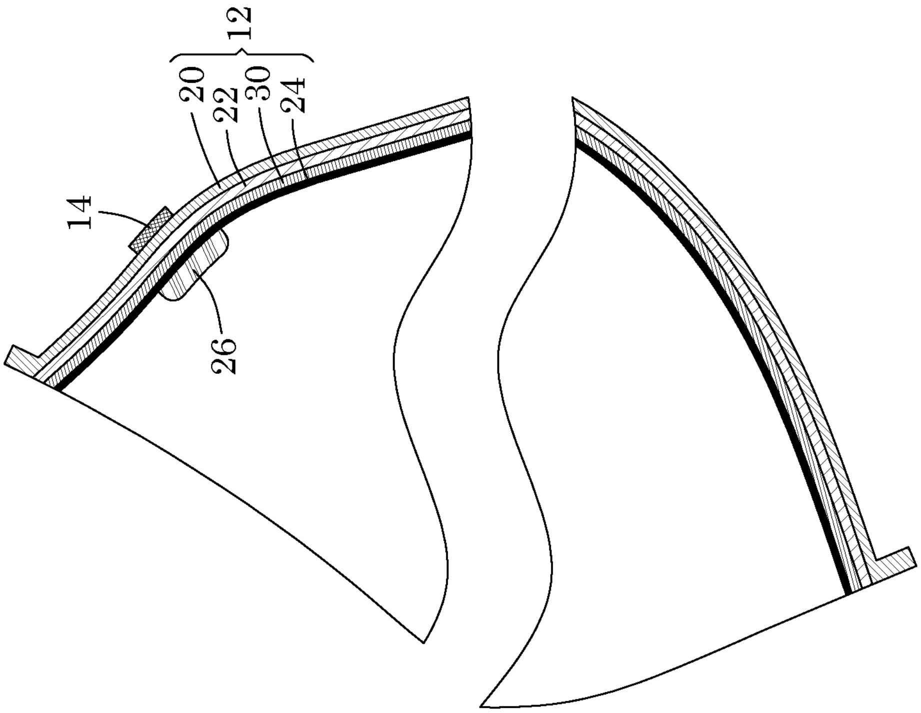
FIG. 3 is a sectional view of an alternative embodiment through lines A-A of FIG. 1.

In another embodiment, shown in FIG. 3, the mask body is lamellar with an outer cover 20, a fiberglass filter layer 22, a filter layer 30 and the inner layer 24. The outer cover 20 is preferably a polyester or other plastic polymer and is transparent to visible light. In one embodiment it is optically transparent. The polyester or other plastic polymer is made of fibers which are either bonded to one another or are woven, in order to provide passageways. The fiberglass filter layer 22 is woven. In one embodiment it is optically transparent. It is functionalized with low iron oxide, iron-doped titanium dioxide nanoparticles. The filter layer 30 is preferably made of plastic polymer fibers which are not bonded and not woven and provide passageways. The inner layer 24 is a polyester or other woven plastic polymer. In one embodiment it is optically transparent. The polyester or other plastic polymer is made of fibers which are bonded to one another or are woven, in order to provide passageways. Nose foam 26 is attached to the inner layer 24 under the nose piece 14.

Figure 4:
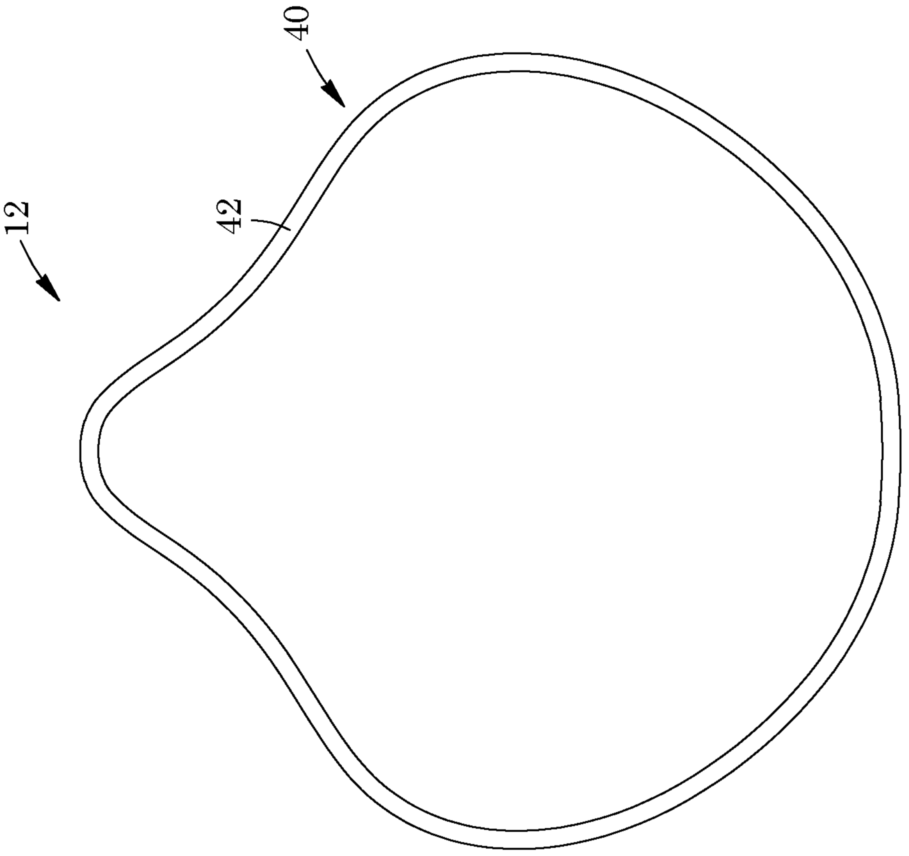
FIG. 4 is an inside view of the disposable mask of FIG. 1.

In another embodiment, shown in FIGS. 4, the periphery of the mask body 12, generally referred to as 40, is provided with a formable border 42. The formable border 42 is pliable and can be molded to a user's face. The formable border 42 is preferably a thin layer of foam or silicone rubber (about 1 mm to about 3 mm). The formable border 42 reduces the chance of air flow between the disposable mask 10 and the user's face.

Figure 5:
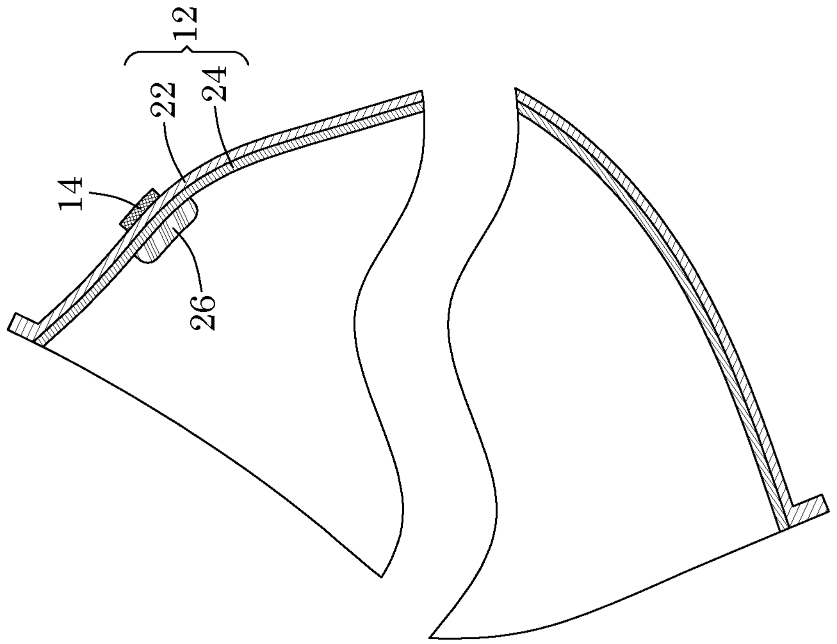
FIG. 5 is a sectional view of an alternative embodiment of FIG. 1.

In another embodiment, shown in FIG. 5, the mask body 12 is lamellar with a fiberglass filter layer 22 and an inner layer 24. The fiberglass filter layer 22 is woven and is optically transparent. It is functionalized with low iron oxide, iron-doped titanium dioxide nanoparticles. The inner layer 24 is a plastic polymer material or rayon material and is optically transparent. The plastic polymer material or rayon material is made of fibers which are either bonded to one another or are woven, in order to provide passageways. Nose foam 26 is attached to the inner layer 24 under the nose piece 14.

Figure 6:
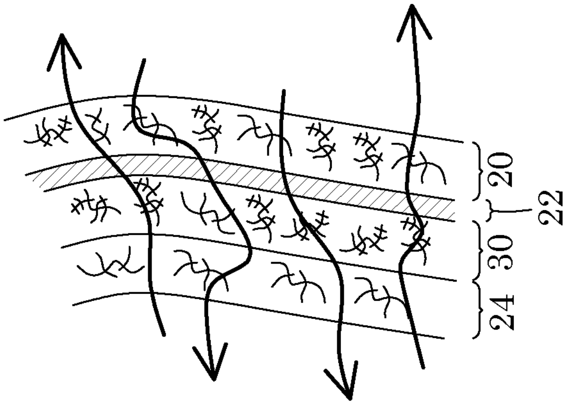
FIG. 6 is a schematic showing gaseous exchange between the user and an ambient environment.

Using the embodiment of FIG. 3 as an example, the flow of gases into and out of the disposable mask or transparent mask is shown in FIG. 6. The passageways of the outer cover 20 and the inner layer 24 are large enough to have a minimal impact on gas exchange. Accordingly, the passageways are in the range of about 0.3 microns to about 0.9 microns, preferably about 0.6 microns to about 0.9 microns. When present, the inner filter layer 30 has passageways of about 0.3 microns to about 0.9 microns, preferably about 0.6 microns to about 0.9 microns.

Figure 7:
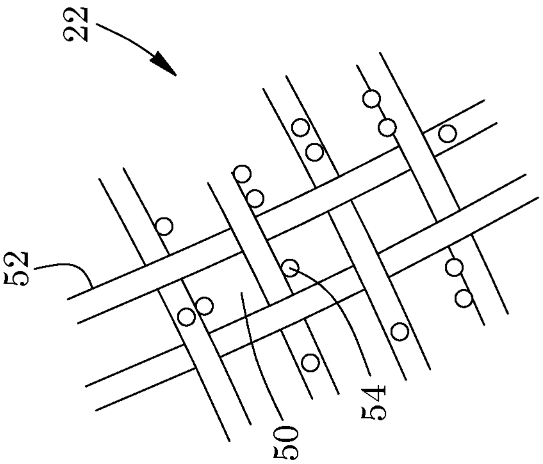
FIG. 7 is a schematic of fiberglass fabric or fiberglass ribbons functionalized with low iron oxide, iron-doped titanium dioxide nanoparticles.

As shown in FIG. 7, the fiberglass filter layer 22 has interstitial spaces 50 between the woven fibers 52. Nanoparticles 54 are attached to the woven fibers 52. Although the weave shown is a one over one weave, other weaves are contemplated. The interstitial spaces 50 are about 0.5 microns to about 1.0 microns across, preferably about 0.9 microns.

In one embodiment, the fiberglass fibers are flattened into ribbons 52 along a single plane which is parallel to the outer cover 20, if present, the inner layer 24 and the filter layer 30, if present. The plastic polymer, rayon or silk fibroin in each layer is matched to the refractive index of the fiberglass ribbons, thus maximizing optical clarity. If different materials including a plastic polymer, rayon or silk fibroin are used in the layers, they are matched to the refractive index of both the fiberglass ribbons 50 and the other layer or layers. Specifically, the refractive index of the plastic polymer is within about 0.010 of the refractive index of the fiberglass ribbons at wavelengths between about 380 nm and about 700 nm.

Potential plastic polymers that provide transparency when used with the fiberglass fabric and their refractive indices are as follows.

TABLE 1

| | |
|---|---|
| Poly(2-chloroethyl methacrylate) | 1.503 |
| Poly(cyclohexyl methacrylate) | 1.507 |
| Poly(isobutene) | 1.507 |
| Poly(2-hydroxyethyl methacrylate) | 1.507 |
| Poly(tetrahydrofurfuryl methacrylate) | 1.508 |
| Poly(acrylic acid), PAA | 1.508 |
| Poly(acrylonitrile) | 1.513 |
| Poly(methyl isopropenyl ketone) | 1.520 |
| Polyisoprene | 1.521 |
| Poly(w-dodecanamide), Nylon 12 | 1.525 |
| Poly(vinyl alcohol) | 1.526 |
| Poly(N-methyl-methacrylamide) | 1.529 |
| Poly(N-methyl-methacrylamide) | 1.529 |
| Poly(caprolactam), ylon 6 | 1.530 |
| Poly(hexamethylene adipamide), Nylon 6,6 | 1.530 |
| Poly(vinyl chloride), PVC | 1.531 |
| Poly(2-bromoethyl methacrylate) | 1.535 |
| Poly(hexamethylene sebacamide), Nylon 6,10 | 1.539 |

Other potential materials, such as, but not limited to, are silk fibroin with a refractive index of 1.54 or rayon with a refractive index of 1.54-1.55.

In an alternative embodiment, the refractive index of the plastic polymeric materials is within 0.1, preferably within 0.06 and most preferably within 0.03 of that of borosilicate glass and the mask body 12 is optically semi-transparent.

TABLE 2

| | |
|---|---|
| Poly(2,2,3,3-tetrafluoropropyl methacrylate) | 1.420 |
| Poly(vinylidene fluoride), PVDF | 1.426 |
| Poly(isobutyl vinyl ether) | 1.451 |
| Poly(oxymethylene) | 1.453 |
| Poly(ethylene glycol) | 1.458 |
| Poly(methyl vinyl ether) | 1.458 |
| Poly(pentyl vinyl ether) | 1.459 |
| Poly(vinyl methyl ketone) | 1.459 |
| Poly(hexyl vinyl ether) | 1.459 |
| Poly(octyl vinyl ether) | 1.461 |
| Poly(3-ethoxypropyl acrylate) | 1.462 |
| Poly(4-methyl-1-pentene) | 1.462 |
| Poly(isopropyl methacrylate) | 1.463 |
| Poly(ethyl vinyl ether) | 1.463 |
| Poly(tert-butyl methacrylate) | 1.464 |
| Poly(dodecyl methacrylate) | 1.465 |
| Poly(butyl acrylate), PBA | 1.465 |
| Polylactic acid, PLA | 1.465 |

TABLE 2-continued

| | |
|---|---|
| Poly(ethyl acrylate), PEA | 1.467 |
| Poly(2-ethoxyethyl acrylate) | 1.474 |
| Poly(methyl acrylate), PMA | 1.476 |
| Poly(ethylene) | 1.476 |
| Poly(vinyl formate) | 1.476 |
| Poly(isobutyl methacrylate) | 1.480 |
| Poly(hexyl methacrylate) | 1.481 |
| Poly(3-methoxypropyl acrylate) | 1.483 |
| Poly(butyl methacrylate) | 1.483 |
| Poly(propyl methacrylate) | 1.484 |
| Poly(vinyl acetate) | 1.484 |
| Poly(vinyl butyral) | 1.485 |
| Poly(methyl methacrylate) | 1.491 |
| Poly(2-ethoxyethyl methacrylate) | 1.495 |
| Poly(1-butene) | 1.497 |
| Poly(ethyl methacrylate) | 1.498 |
| Poly(2-chloroethyl methacrylate) | 1.503 |
| Poly(cyclohexyl methacrylate) | 1.507 |
| Poly(isobutene) | 1.507 |
| Poly(2-hydroxyethyl methacrylate) | 1.507 |
| Poly(tetrahydrofurfuryl methacrylate) | 1.508 |
| Poly(acrylic acid), PAA | 1.508 |
| Poly(acrylonitrile) | 1.513 |
| Poly(methyl isopropenyl ketone) | 1.520 |
| Polyisoprene | 1.521 |
| Poly(w-dodecanamide), Nylon 12 | 1.525 |
| Poly(vinyl alcohol) | 1.526 |
| Poly(N-methyl-methacrylamide) | 1.529 |
| Poly(N-methyl-methacrylamide) | 1.529 |
| Poly(caprolactam), nylon 6 | 1.530 |
| Poly(hexamethylene adipamide), Nylon 6,6 | 1.530 |
| Poly(vinyl chloride), PVC | 1.531 |
| Poly(2-bromoethyl methacrylate) | 1.535 |
| Poly(hexamethylene sebacamide), Nylon 6,10 | 1.539 |
| Poly(1,4-butadiene) | 1.539 |
| Poly(2-phenylethyl methacrylate) | 1.547 |

Figure 8B:
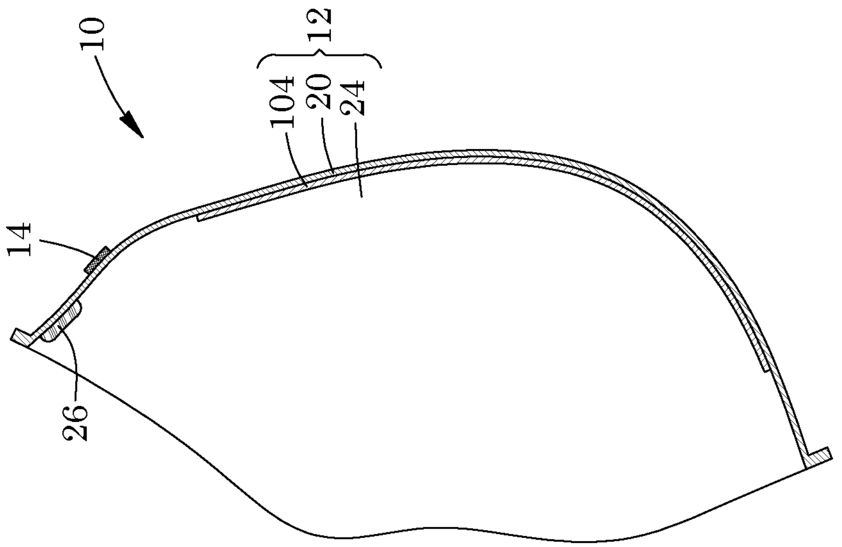
FIG. 8B is a sectional view of the disposable mask along line 8B-8B.
Figure 8A:
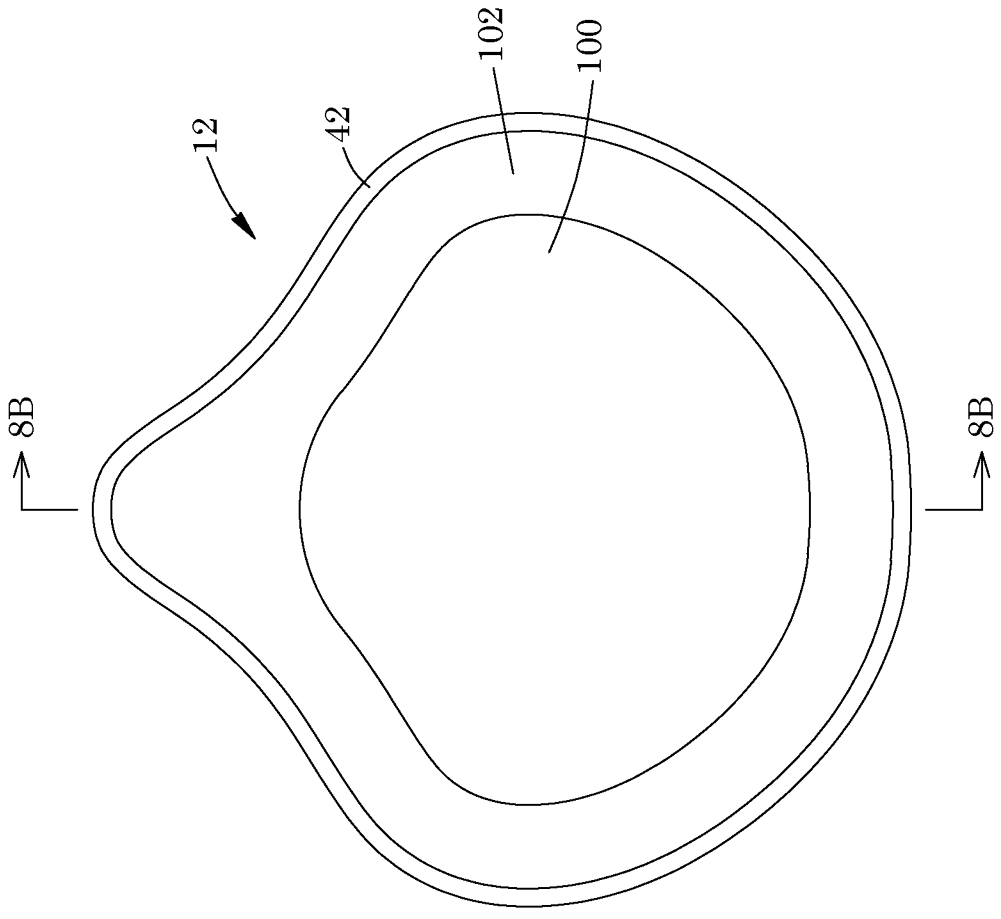
FIG. 8A is an inside view of an alternative embodiment disposable mask.

As shown in FIG. 8A, in an alternative embodiment, the mask body 12 has a sintered glass zone 100 which is bounded by a boundary zone 102. The boundary zone 102 is flexible and allows the mask body 12 to form-fit a user's face, covering their mouth, chin and nose. The mask body 12 may or may not include the formable border 42. As shown in FIG. 8B, the sintered glass zone 100 includes at least a functionalized sintered glass filter layer 104 and the inner layer 24. The outer cover 20 is optional and if present, is light transparent. The boundary zone 102 includes at least the outer cover 20 and the inner layer 24 and may include the filter layer 30. The functionalized thin sintered glass filter layer 104 is about 2 microns to about 20 microns thick. The thickness dictates the flexibility, thus a minimal thickness is desired. Flexibility in the functionalized thin sintered glass layer 104 is sufficient to permit bending to an effective radius of curvature of less than 20 centimeters, preferably less than 5 centimeters, more preferably less than 1 centimeter, and most preferably less than 0.5 centimeter or some equivalent measure. The thin sintered glass is functionalized after sintering.

In another embodiment, the sintered glass zone is replaced with a fiberglass zone, rather than the fiberglass filter layer having the same dimensions as the mask body 12. The fiberglass zone has functionalized fiberglass sandwiched between at least the outer cover and the inner layer.

In another alternative embodiment, the outer cover is not present and the outermost layer is the fiberglass filter layer.

In yet another alternative embodiment, the outermost layer is the fiberglass filter layer. A standard disposable mask is attached to the inner surface of the fiberglass filter layer. This embodiment does not address poor gas exchange of a standard mask.

In all embodiments, the fiberglass filter layer is separated from the user's face with at least the inner layer. This layer traps any nanoparticles or fiberglass fibers that might break away from the fiberglass filter layer.

Figure 9:
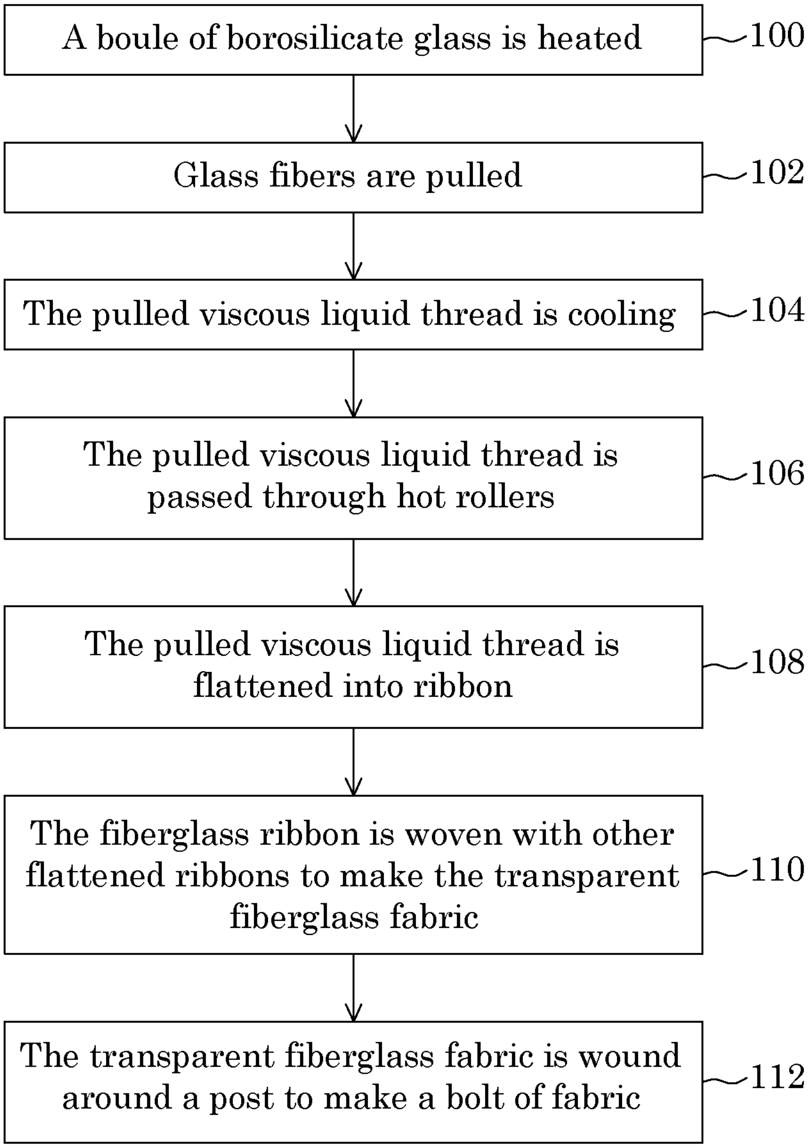
FIG. 9 is a block diagram showing the manufacturing of the fiberglass ribbons and the resultant fabric.

One method of preparing the optically transparent fiberglass fabric is shown in FIG. 9. A boule of borosilicate glass is heated 100 to about 1200 C. Glass fibers are pulled 102 into a viscous liquid thread. As the pulled viscous liquid thread is cooling 104 it is passed 106 through hot rollers, flattening 108 the fibers into ribbons. The fiberglass ribbon is then woven 110 together with other flattened ribbons to make the optically transparent fiberglass fabric. The optically transparent fiberglass fabric is then wound 112 around a post to make a bolt of fabric.

Figure 10:
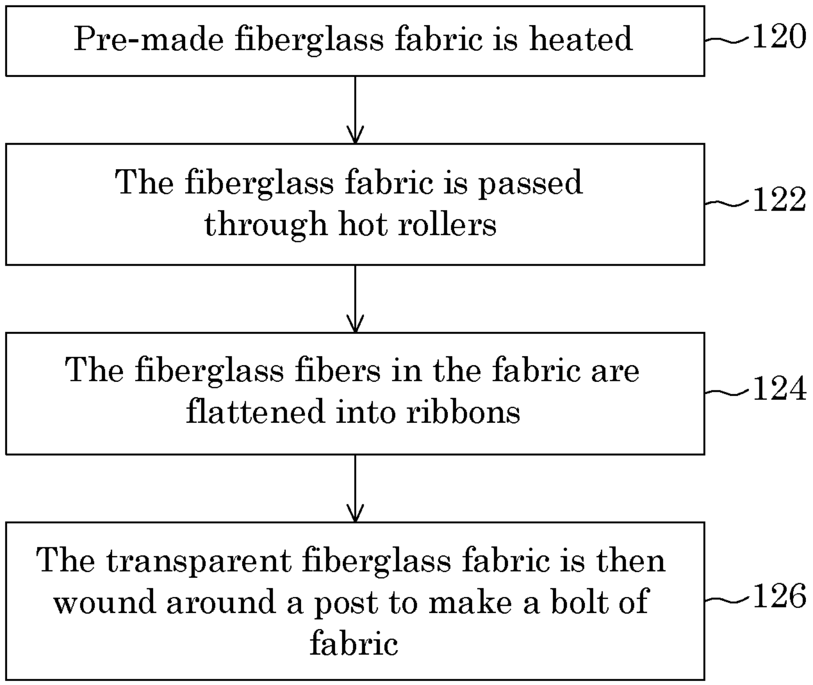
FIG. 10 is a block diagram showing an alternative method of manufacturing the fiberglass ribbons and the resultant fabric.

A second method of preparing the optically transparent fiberglass fabric is shown in FIG. 10. Pre-made fiberglass fabric is heated 120 to about 1100 C, such that it the fibers are an amorphous solid. The fiberglass fiber is passed 122 through hot rollers, flattening 124 the fibers in the fabric into ribbons. The optically transparent fiberglass fabric is then wound 126 around a post to make a bolt of fabric.

The functionalized fiberglass fabric, the functionalized optically transparent fiberglass fabric or the functionalized sintered glass are functionalized with low iron oxide, or substantially iron oxide free, iron-doped titanium dioxide which preferably contains about 0.5 atomic % iron but can range from about 0.1 atomic % iron to about 2.0 atomic % iron.

Figure 11:
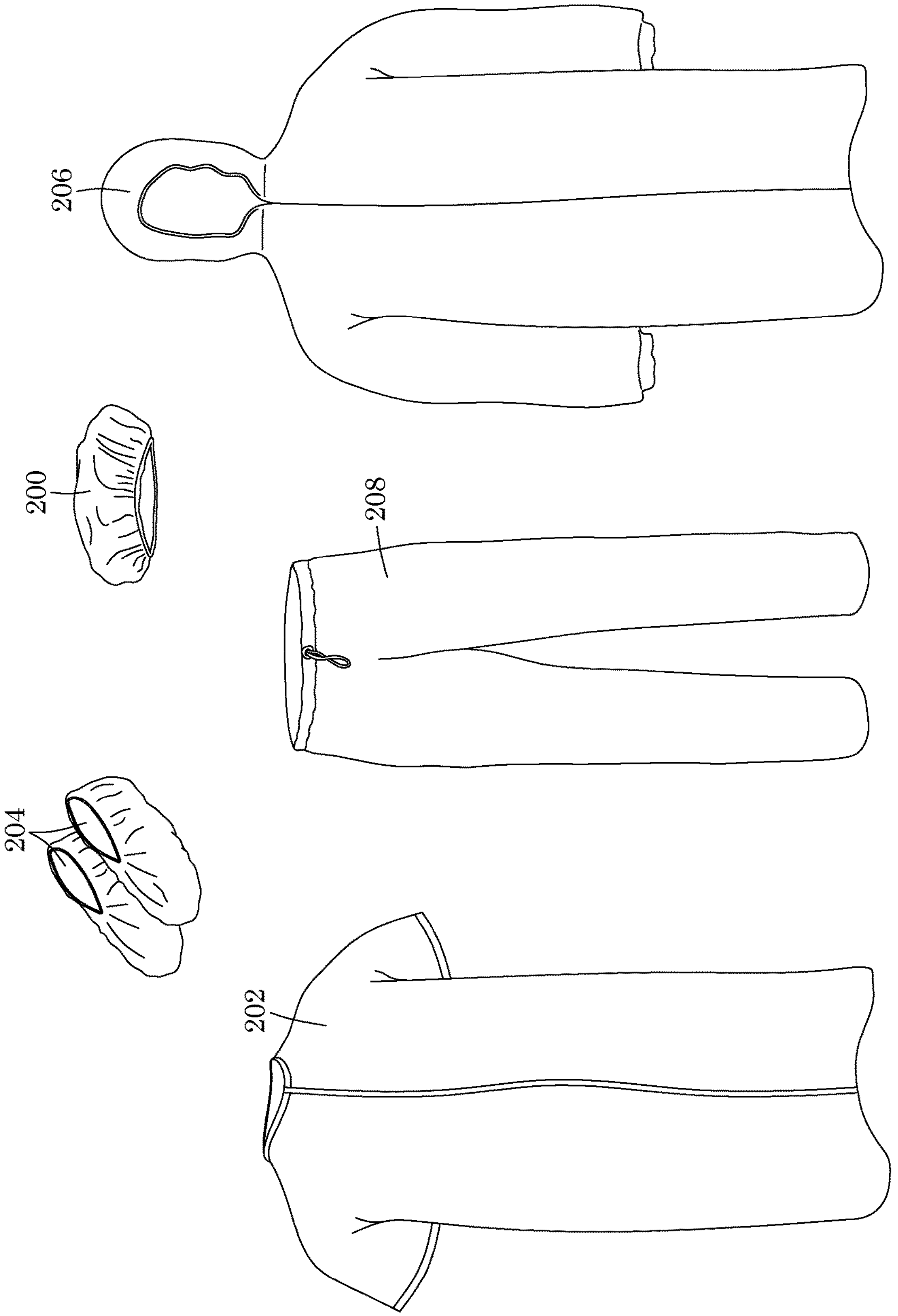
FIG. 11 is a schematic of functionalized fiberglass fabric apparel.

In another embodiment the functionalized fiberglass fabric is between about 50 microns to about 1 mm thick and preferably 60 microns thick and is used in personal protection apparel. As shown in FIG. 11, the apparel includes a cap 200, a gown 202, booties 204, a hooded gown 206 and pants 208.

The functionalized fiberglass fabric or the functionalized sintered glass are functionalized with low iron oxide, or substantially iron oxide free, iron-doped titanium dioxide which preferably contains about 0.5 atomic % iron but can range from about 0.1 atomic % iron to about 2.0 atomic % iron.

Figure 12:
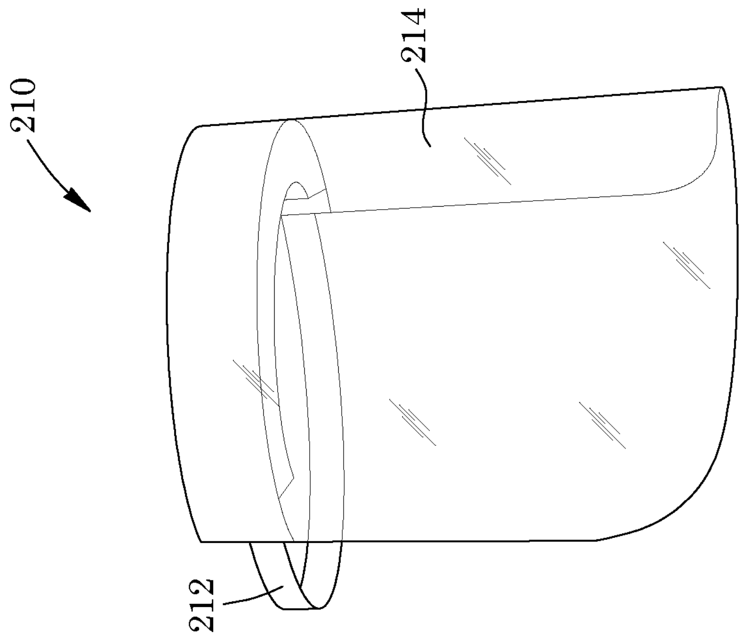
FIG. 12 is a schematic of a face shield.

As shown in FIG. 12, a glass or plastic face shield, generally referred to as 210 includes a band 212 and a visor 214. The visor 214 is functionalized with low iron oxide, or substantially iron oxide free, iron-doped titanium dioxide which preferably contains about 0.5 atomic % iron but can range from about 0.1 atomic % iron to about 2.0 atomic % iron.

Plastic or glass goggles have lenses that are functionalized with low iron oxide, or substantially iron oxide free, iron-doped titanium dioxide which preferably contains about 0.5 atomic % iron but can range from about 0.1 atomic % iron to about 2.0 atomic % iron.

One method of preparing the low iron oxide, iron-doped titanium dioxide functionalized fiberglass, functionalized optically transparent fiberglass fabric or sintered glass is as follows:

The iron-doped titanium dioxide nanoparticles were prepared by the sol-gel method using titanium isopropoxide (TTIP) as the precursor and ferric nitrate (Fe(NO3)3·9H2O) as the iron source. Firstly, the desired amount of ferric nitrate (0.25, 0.5, 1, 5 and 10 molar %) was dissolved in water and then the solution was added to 30 mL of anhydrous ethyl alcohol and stirred for 10 minutes. The acidity of the solution was adjusted to about pH 3 (about pH 2.5 to about pH 3.5) using HNO3 (other acids could also be used), which produces better Fe doped TiO2, i.e., incorporation of Fe into the TiO2 nanocrystals. Secondly, TTIP was added dropwise to the solution. Then deionized water with the ratio of Ti:H2O (1:4) was added to the mixture. The solution was stirred for two hours, poured onto the fiberglass fabric and then dried at 80° C. to form particles on the fiberglass fabric. The combination of the particles and the fiberglass fabric was then washed three times with deionized water. Next, the combination was calcined at 400° C. for four hours to adhere the iron-doped titanium dioxide nanoparticles to the fiberglass fibers of the fabric, thus producing functionalized fiberglass. The functionalized fiberglass was washed in an HCl solution (acid washed) and then washed with deionized water three times. The acid washing was in a solution of about pH 2.5 to about pH 3.5, or about pH 4, with, preferably, a monoprotic acid, such as, for example, but not limited to acetic acid (CH3CO2H or HOAc), hydrochloric acid (HCl), hydroiodic acid (HI), hydrobromic acid (HBr), perchloric acid (HClO4), nitric acid (HNO3) or sulfuric acid (H2SO4), with HCl being the preferred. Through analysis, it was shown that the nanoparticles bind to the fiberglass fibers or the sintered glass. The binding between the glass and Fe doped $TiO_2$ is between the oxygen ions and not between Si and Ti ions.

A second method of preparing the low iron oxide, iron-doped titanium dioxide functionalized fiberglass, functionalized optically transparent fiberglass fabric or sintered glass is as follows:

The low iron oxide, iron-doped titanium dioxide nanoparticles were prepared by the sol-gel method using titanium isopropoxide (TTIP) as the precursor and ferric nitrate ($Fe(NO_3)_3 \cdot 9H_2O$) as the iron source. Firstly, the desired amount of ferric nitrate (0.25, 0.5, 1, 5 and 10 molar %) was dissolved in water and then the solution was added to 30 mL of anhydrous ethyl alcohol and stirred for 10 minutes. The acidity of the solution was adjusted to about pH 3 (about pH 2.5 to about pH 3.5) using $HNO_3$ (other acids could also be used), which produces better Fe doped $TiO_2$, i.e., incorporation of Fe into the $TiO_2$ nanocrystals. Secondly, TTIP was added dropwise to the solution. Then deionized water with the ratio of $Ti:H_2O$ (1:4) was added to the mixture. The solution was stirred for two hours and then dried at 80° C. for two hours.

The powders were then washed three times with deionized water. Next, the powder was calcined at 400° C. for three hours. The calcined powder was stirred in an HCl solution (acid washed) and then washed with deionized water three times. The acid washing was in a solution of about pH 2.5 to about pH 3.5, or about pH 4, with, preferably, a monoprotic acid, such as, for example, but not limited to acetic acid ($CH_3CO_2H$ or HOAc), hydrochloric acid (HCl), hydroiodic acid (HI), hydrobromic acid (HBr), perchloric acid ($HClO_4$), nitric acid ($HNO_3$) or sulfuric acid ($H_2SO_4$), with HCl being the preferred. The acid washing produced low iron oxide, iron-doped titanium dioxide. The low iron oxide, iron-doped titanium dioxide nanoparticles were suspended in water and either sprayed onto the fiberglass fabric or sintered glass, or the fiberglass fabric or sintered glass was immersed in the water. The combination of the fiberglass fabric and the low iron oxide, iron-doped titanium dioxide nanoparticles was calcined at 400° C. for four hours to adhere the low iron oxide, iron-doped titanium dioxide nanoparticles to the fiberglass fibers of the fabric, thus producing functionalized fiberglass. Through analysis, it was shown that the nanoparticles bind to the fiberglass fibers or ribbons. The binding between the glass and Fe doped $TiO_2$ is between the oxygen ions and not between Si and Ti ions.

A third method of preparing the optically transparent, low iron oxide, iron-doped titanium dioxide functionalized fiberglass is as follows: High purity iron of 99.999% (made by electrolytic refining) and titanium dioxide of 99.999% purity are mixed together as epi-layers on the fiberglass fabric using sputter deposition methods. Argon, nitrogen or xenon of 99.999% purity are used as the ionized gas. A thin epi layer of titanium dioxide is deposited followed by an epi layer of iron and a second epi layer of titanium dioxide. One method employed, which has some control over the amount of the deposition, involved depositing 100 nm titanium dioxide, then depositing 10 nm iron followed by depositing another 100 nm layer of titanium dioxide for an epi-layer thickness of 210 nm. This was then annealed to homogenize the iron within the titanium dioxide producing a material of 4.7 vol % iron doped titanium dioxide or 8.7 wt % iron doped titanium dioxide. Adjusting the thickness of the deposited iron epi-layer sandwiched between the titanium epi-layers allows for the synthesis of a range of concentrations of iron doping. This method does not require acid washing.

In an alternative embodiment, a face mask 10 with an optically semi-transparent or optically transparent mask body 12 is provided that includes a fiberglass fabric layer consisting of fiberglass ribbons. The fiberglass ribbons and the fiberglass fabric is not functionalized.

The mask body 12 is manufactured by selecting the appropriate materials for the inner layer and the outer layer in terms of optical transmission and then checking that the refractive indices are close enough to the refractive index of the fiberglass material. Once selected, the materials are shaped (cutting and potentially forming) to the shape of the mask body 12. Either before shaping or after shaping the layers are attached to one another to provide the mask body.

Regardless of the method of producing the low iron oxide, iron-doped titanium dioxide nanoparticle functionalized fiberglass fabric, the acid washing was shown to remove a significant amount of iron oxide from the surface of the nanoparticles. The acid-washed iron-doped titanium dioxide nanoparticles function as catalysts under visible light.

The method of reducing or eliminating airborne pathogens is as follows:

A user places the disposable mask or optically transparent mask of any of the embodiment described above over their mouth, nose and chin, places the elastomeric straps around their ears or around their head and crimps the nose piece so that it conforms to the shape of the user's nose. The user checks to ensure that there are no gaps between the user and the mask. The mask covers part of the nose, including the nostrils, part of the cheeks, and part of the chin, if fitted correctly. The user breaths normally. As the air being expelled from the user is moist, and the functionalized fiberglass layer is exposed to visible light, the nanoparticles act as photocatalysts. Without being bound to theory, the low iron oxide iron doped titanium dioxide produces electrons and holes when exposed to visible light. The electrons combine with Fe+3 in the low iron oxide iron doped titanium dioxide to form Fe+2 and the hole combines with Fe+3 to form Fe+4. The Fe+2 ion reacts with O2 from the air to form superoxide, an oxidizing radical. The Fe+4 ion reacts with OH— ions from water in the air to form the hydroxyl radical. Thus, the moist air that is expelled from the user initiates this reaction in the presence of visible light. The radicals then inhibit growth or eliminate the pathogens. During inhalation, moisture that it retained in the mask allows for the reaction to occur, even in the absence of sufficient moisture in the air. The moisture is retained by the inner layer, which is adjacent to the functionalized fiberglass layer, allowing moisture to wick into the functionalized fiberglass layer.

Example 1

The mask of FIG. 2, which has only one filtration layer, reduced mean tidal volume by an average of 13.7% in a sample of five users and lowered minute ventilation by an average of 15.2% in a sample of five user.

Example 2

The mask of FIG. 3, which has two filtration layers reduced mean tidal volume by an average of 16.2% in a sample of five users and lowered minute ventilation by an average of 18.4% in a sample of five users.

Example 3

The low iron oxide, iron-doped titanium dioxide functionalized fiberglass or functionalized optically transparent fiberglass fabric will be tested for its virucidal activity. Surrogate coronaviruses, mouse hepatitis virus (MHV) and transmissible gastroenteritis virus, were used in the AATCC 100 test, modified for viruses, as follows:

Low iron oxide, iron-doped titanium dioxide functionalized fiberglass or functionalized optically transparent fiberglass fabric and control (not functionalized) fiberglass fabrics are cut to swatches of the appropriate size for the study.

A 1.0 ml inoculum volume is applied to the low iron oxide, iron-doped titanium dioxide functionalized fiberglass and control swatches, taking care to ensure that the suspension touches only the fabric. The inoculum must be fully absorbed-more swatches can be added if necessary.

A 1.0 ml inoculum volume is also applied to a separate set of untreated cotton swatches to serve as the "Time Zero" control.

The "Time Zero" control is immediately neutralized in the appropriate media. The suspension is serially diluted and each dilution is plated in quadruplicate to host cell monolayers.

The low iron oxide, iron-doped titanium dioxide functionalized fiberglass swatches and control swatches are allowed to incubate at the selected temperature for the duration of the contact time.

At the close of the contact time, the low iron oxide, iron-doped titanium dioxide functionalized fiberglass and control swatches are neutralized. The harvest suspensions are serially diluted and each dilution is plated in quadruplicate to host cell monolayers.

The enumeration assay is allowed to incubate at the appropriate temperature for the test virus, usually for 7 days.

The enumeration assay is scored using standard cell culture techniques.

It is anticipated that the low iron oxide, iron-doped titanium dioxide functionalized fiberglass will reduce or eliminate the inoculum relative to the control.

While example embodiments have been described in connection with what is presently considered to be an example of a possible most practical and/or suitable embodiment, it is to be understood that the descriptions are not to be limited to the disclosed embodiments, but on the contrary, is intended to cover various modifications and equivalent arrangements included within the spirit and scope of the example embodiment. Those skilled in the art will recognize or be able to ascertain using no more than routine experimentation, many equivalents to the specific example embodiments specifically described herein. Such equivalents are intended to be encompassed in the scope of the claims, if appended hereto or subsequently filed.

The invention claimed is:

1. A disposable mask comprising a mask body, which includes a periphery, and straps attached to the mask body proximate the periphery for releasably retaining the mask on a user's face, the mask body including: an inner layer, which is a polymeric plastic material with a plurality of passageways therethrough, and which has an inner surface and an outer surface; and a sintered glass filter which is functionalized with a low iron oxide, iron-doped titanium dioxide nanoparticle and abuts the outer surface of the inner layer.

2. The disposable mask of claim 1, wherein the sintered glass filter is in a filter zone bounded by a boundary zone, the boundary zone comprising the inner layer and extending from the filter zone to the periphery.

3. The disposable mask of claim 2, wherein the low iron oxide, iron-doped titanium dioxide nanoparticles have substantially iron oxide free surfaces.

4. The disposable mask of claim 2, wherein the iron-doped titanium dioxide nanoparticles have a surface with less than 5% of the surface being iron oxide.

5. The disposable mask of claim 4, the mask body further comprising a formable border proximate the periphery of the inner surface of the inner layer.

6. The disposable mask of claim 5, the mask body further comprising a transparent outer cover which is a polymeric plastic material with a plurality of passageways therethrough and abuts the sintered glass filter.

* * * * *